(12) United States Patent
Komiyama

(10) Patent No.: US 10,086,448 B2
(45) Date of Patent: Oct. 2, 2018

(54) INDEXABLE CUTTING TOOL

(71) Applicant: TUNGALOY CORPORATION, Iwaki-shi, Fukushima (JP)

(72) Inventor: Satoshi Komiyama, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 249 days.

(21) Appl. No.: 14/890,074

(22) PCT Filed: May 8, 2014

(86) PCT No.: PCT/JP2014/062298
§ 371 (c)(1),
(2) Date: Nov. 9, 2015

(87) PCT Pub. No.: WO2014/181811
PCT Pub. Date: Nov. 13, 2014

(65) Prior Publication Data
US 2016/0082527 A1 Mar. 24, 2016

(30) Foreign Application Priority Data

May 10, 2013 (JP) .................................. 2013-099843

(51) Int. Cl.
*B23C 5/10* (2006.01)
*B23C 5/20* (2006.01)
*B23C 5/22* (2006.01)

(52) U.S. Cl.
CPC ............ *B23C 5/1045* (2013.01); *B23C 5/202* (2013.01); *B23C 5/2213* (2013.01);
(Continued)

(58) Field of Classification Search
CPC ..... B23C 5/1045; B23C 5/0127; B23C 5/202; B23C 5/207; B23C 5/2213;
(Continued)

(56) References Cited

U.S. PATENT DOCUMENTS 5,924,824 A 7/1999 Satran et al.
5,951,213 A * 9/1999 Fauser .................. B23C 5/1045
407/113

(Continued)

FOREIGN PATENT DOCUMENTS

AT 12630 U1 * 9/2012 ............. B23C 5/202
DE 19846060 A1 * 6/2000 ........... B23C 5/1045
(Continued)

OTHER PUBLICATIONS

International Search Report dated Aug. 5, 2014 in PCT counterpart application (No. PCT/JP2014/062298).
(Continued)

*Primary Examiner* — Ryan Rufo
(74) *Attorney, Agent, or Firm* — Studebaker & Brackett PC

(57) ABSTRACT

A cutting insert has top and bottom surfaces opposing each other and a side surface connecting them. A part of an intersecting ridge between the top and side surfaces functions as a cutting edge. On the side surface, a side surface portion adjacent to the intersecting ridge portion opposing the cutting edge intersects the top surface at an acute angle. At least on a part of a bottom surface, an inclined surface gradually approaching the top surface with increasing distance from a side surface portion on a side opposite to a cutting edge is formed. This allows a part of the cutting resistance to act on the side surface portion. As a result, friction resistance between the side surface portion and the side surface of an insert seat becomes larger, thereby suppressing a shifting of the cutting insert when cutting.

2 Claims, 7 Drawing Sheets

(52) U.S. Cl.
CPC .... *B23C 5/1027* (2013.01); *B23C 2200/0416* (2013.01); *B23C 2200/086* (2013.01); *B23C 2200/128* (2013.01); *B23C 2200/164* (2013.01); *B23C 2200/165* (2013.01); *B23C 2200/168* (2013.01); *B23C 2200/203* (2013.01); *B23C 2200/205* (2013.01); *B23C 2200/326* (2013.01); *B23C 2210/168* (2013.01); *B23C 2210/202* (2013.01)

(58) Field of Classification Search
CPC ........ B23B 2200/128; B23B 2200/164; B23B 2200/165; B23B 2200/203
See application file for complete search history.

(56) References Cited

U.S. PATENT DOCUMENTS

| | | | |
|---|---|---|---|
| 6,149,355 A | 11/2000 | Fouquer et al. | |
| 6,840,716 B2* | 1/2005 | Morgulis | B23C 5/109 |
| | | | 407/103 |
| 2003/0219320 A1 | 11/2003 | Horiike et al. | |
| 2003/0219329 A1 | 11/2003 | Horiike et al. | |
| 2005/0147475 A1* | 7/2005 | Nagaya | B23C 5/109 |
| | | | 407/42 |
| 2006/0056926 A1* | 3/2006 | Riviere | B23C 5/1045 |
| | | | 407/40 |
| 2010/0003090 A1* | 1/2010 | Johansson | B23C 5/202 |
| | | | 407/113 |
| 2010/0124465 A1 | 5/2010 | Morrison et al. | |
| 2011/0236143 A1 | 9/2011 | Ryu | |
| 2011/0243672 A1 | 10/2011 | Kim | |
| 2012/0070238 A1* | 3/2012 | Men | B23C 5/1045 |
| | | | 407/42 |
| 2012/0301235 A1 | 11/2012 | Yoshioka et al. | |
| 2015/0336187 A1 | 11/2015 | Choi et al. | |

FOREIGN PATENT DOCUMENTS

| | | | | |
|---|---|---|---|---|
| EP | 0842723 A | 5/1998 | | |
| EP | 0842723 A1 | 5/1998 | | |
| JP | 11-070404 A | * 3/1999 | ............... | B23C 5/10 |
| JP | 11-156625 A | * 6/1999 | ............... | B23C 5/10 |
| WO | WO 2010061988 A1 | * 6/2010 | ........... | B23C 5/1045 |

OTHER PUBLICATIONS

International Preliminary Report on Patentability (Chapter I) dated Nov. 19, 2015 in PCT counterpart application (No. PCT/JP2014/062298).

* cited by examiner

INDEXABLE CUTTING TOOL

RELATED APPLICATIONS

This is a 371 US National Phase of International Patent Application No. PCT/JP2014/062298 filed May 8, 2014, and published as WO 2014/181811 on Nov. 13, 2014, which claims priority to JP 2013-099843, filed May 10, 2013. The contents of the aforementioned applications are incorporated by reference in their entirety.

TECHNICAL FIELD

The present invention relates to a cutting insert, a tool body on which the cutting insert may be mounted, a replaceable-blade-type cutting tool (i.e., an indexable cutting tool) provided therewith, and an end mill. More particularly, the present invention is suitable to be applied to structures of a cutting insert and a tool body constituting an indexable cutting tool and a ball end mill.

BACKGROUND ART

Conventionally, as an indexable ball-end mill, a two-blade type having two cutting inserts as disclosed in Patent Literature 1 is used in general. In the ball end mill described in the Literature, two types of cutting inserts, that is, a cutting insert functioning as a central cutting edge and a cutting insert functioning as an outer peripheral cutting edge are used. Each of the both cutting inserts includes a top surface, a bottom surface seated on an insert seat of the tool body, and a side surface connecting these surfaces. Two opposing cutting edges are provided on an intersecting ridge portion between the top surface and the side surface. The side surface (so-called flank) adjacent to the cutting edges is of a so-called positive type having a positive clearance angle.

CITATION LIST

Patent Literature

SUMMARY OF INVENTION

Technical Problem

Therefore, the cutting insert disclosed in Patent Literature 1 can be mounted to the insert seat of the tool body by changing a position so that either one of the cutting edges is involved in cutting, and the side surface adjacent to the other cutting edge at this time is abutted against and fixed to the corresponding side surface of the insert seat of the tool body. However, with the ball end mill in Patent Literature 1, since the cutting insert is of the positive type, a force for rotating the cutting insert acts by a moment caused by cutting resistance on the one cutting edge involved in the cutting by using a portion located in the vicinity immediately below the cutting edge as a fulcrum in a contact portion between the cutting insert and a bottom surface of the insert seat. On the other hand, the side surface adjacent to the other cutting edge abutting against the side surface of the insert seat forms an obtuse angle to the bottom surface and a bottom surface of the insert seat. Thus, it is likely that the cutting insert is pulled out of the side surface of the insert seat and lifted or shifted. Such a motion of the cutting insert can result in deterioration of cutting accuracy or breakage of the cutting edge. Moreover, in order to make the cutting insert immovable, a large load is applied to a mounting screw for fixing the cutting insert to the tool body, and as a result, it is likely that breakage of the mounting screw is caused.

The present invention is to solve the aforementioned problems and has an object to prevent disadvantage that, in a cutting insert having at least one cutting edge in which the cutting edge is mounted so as to be involved in cutting, and a surface including a rake surface of the cutting edge and a side surface portion on a side opposite to the cutting edge intersect each other at an angle less than 90°, the side surface portion of the cutting insert is pulled out of a side surface of the insert seat due to cutting resistance applied to the cutting edge and lifted or shifted.

Solution to Problem

For this purpose, in the present invention, there is provided a cutting insert (1) having a first surface (2), a second surface (3) opposite to the first surface (2), and a side surface (4) connecting the first surface (2) and the second surface (3) to each other, in which a part of an intersecting ridge between the first surface (2) and the side surface (4) functions as a cutting edge (8), wherein on the side surface (4), a side surface portion (4*b*) in contact with the ridge portion opposite to the cutting edge (8) on the first surface (2) intersects the first surface (2) at an angle less than 90°; and an inclined surface (12) which gradually approaches the first surface (2) with increasing distance from the side surface portion (4*b*) is formed on at least a part of the second surface (3).

In addition, the present invention also consists in an insert seat (22) to which the above cutting insert (1) can be mounted or in an indexable cutting tool (20) comprising the tool body (21) and the above cutting insert (1).

In the above cutting insert, each of the first surface (2) and the second surface (3) may have a shape of an overlapping portion when two circles partly overlap each other in a plan view; and the first surface (2) and the second surface (3) may be connected by at least two side surface portions of the side surface portion (4*b*) intersecting the first surface (2) at an angle less than 90° and an opposing side surface portion (4*a*) opposed to the side surface portion (4*b*). In this case, the cutting insert may be constructed as a form in that each of the first surface (2) and the second surface (3) may have a shape of an overlapping portion when two circles partly overlap each other in a plan view; and the first surface (2) and the second surface (3) may be connected by at least two side surface portions of the side surface portion (4*b*) intersecting the first surface (2) at an angle less than 90° and an opposing side surface portion (4*a*) opposed to the side surface portion (4*b*). Further, the present invention also consists in a tool body (21) of an indexable ball end mill (20) comprising three insert seats (22) to each of which the cutting insert (1) can be mounted, wherein the three insert seats (22) have two insert seats for outer peripheral cutting edges and one insert seat for central cutting edge, the three cutting inserts are mounted such that the first cutting edge (8) is involved in cutting on one of the insert seats for outer peripheral cutting edges; the third cutting edge (9) is involved in cutting on the other of the insert seats for outer peripheral cutting edges; and the second cutting edge (10) is involved in cutting on the insert seat for central cutting edge, or consists in an indexable ball end mill (20) comprising the tool body (21) and three cutting insert (1) in the form as the above mounted on the tool body (21).

Advantageous Effects of Invention

According to the present invention, since the cutting resistance applied to the cutting edge (8) is resolved into a force perpendicular to the inclined surface (12) and a force parallel thereto, a part of the cutting resistance can be made to act on the side surface (4b) of the cutting insert (1). Therefore, the force acting perpendicularly to the side surface (4b) can be made larger, and thus, friction resistance between the side surface 4b of the cutting insert (1) and a side surface 24 of the insert seat 22 can be made larger. As a result, even if the side surface (4b) forming an angle of 90 degrees or more to the second surface (3) is brought into contact with the side surface (24) of the insert seat (22), a undesirable motion of the cutting insert by the cutting resistance applied to the cutting edge is suppressed.

DESCRIPTION OF EMBODIMENTS

Figure 1:
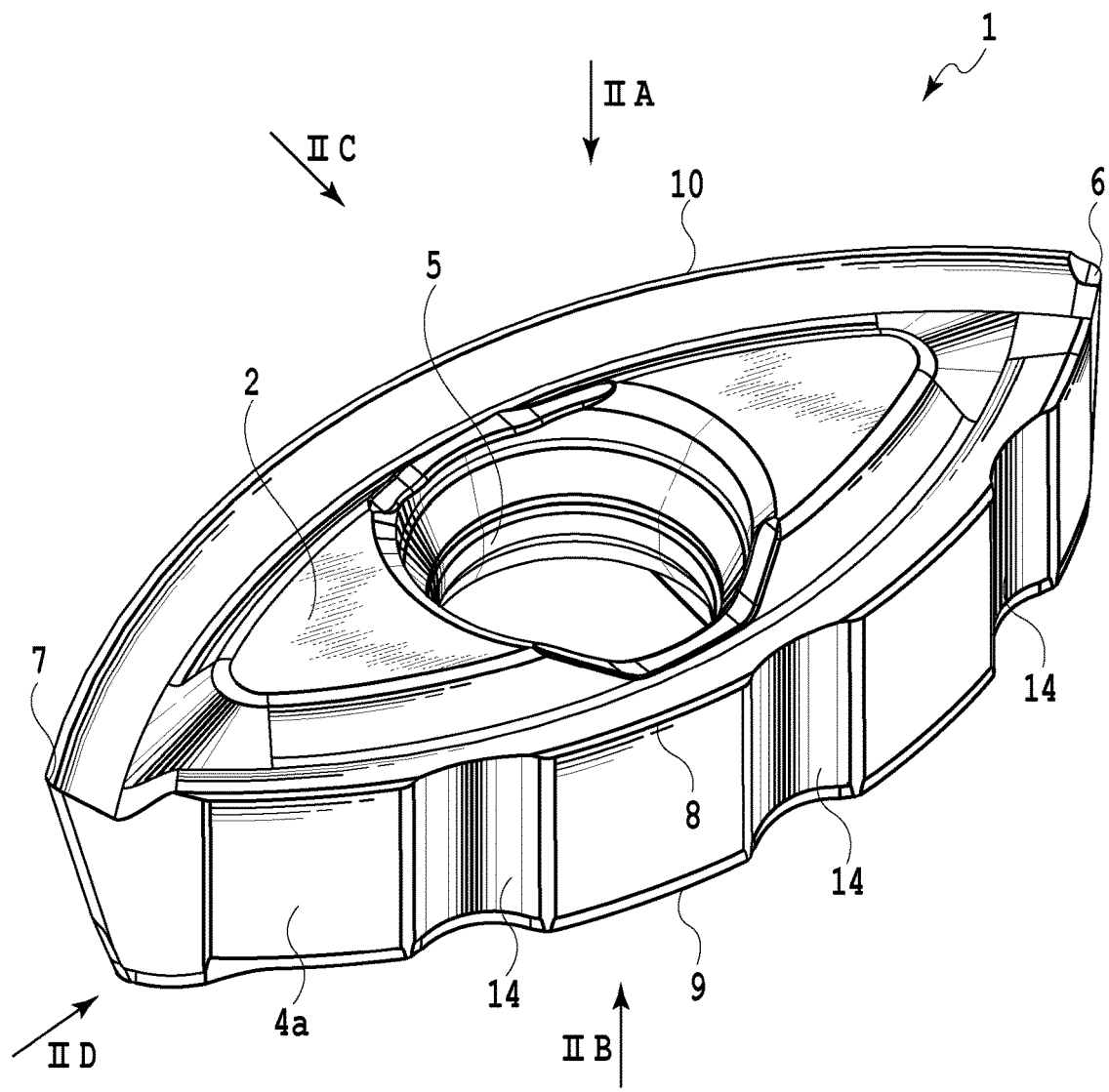
FIG. 1 is a perspective view of an embodiment of a cutting insert of the present invention.

An embodiment of a cutting insert of the present invention will be described below in detail by referring to the attached drawings.

The cutting insert 1 according to the present embodiment is basically constituted by, as shown in FIGS. 1, 2A to 2D and 3, a first surface (hereinafter referred to as a top surface) 2 having a shape such that two arcs with the same center angle less than 180 degrees are connected at end portions to each other in a plan view (FIG. 2A), that is, a shape having an overlapping portion defined when two circles partly overlap each other (hereinafter referred to as "the overlapping portion of two circles"); a second surface (hereinafter referred to as a bottom surface) 3 having substantially the same shape as the top surface 2 and provided substantially in parallel with the top surface 2; and a side surface 4 connecting the top surface 2 and the bottom surface 3. Moreover, substantially at a center of the top surface 2 and the bottom surface 3, a fixing hole 5 penetrating the top and bottom surfaces 2 and 3 is provided. The side surface 4 is divided by a line connecting two top portions (corresponding to two points where the above two circles cross each other) 6 and 7 of the top surface 2 and the bottom surface 3 as a boundary into a side surface 4a and a side surface 4b. The side surface 4a is a side surface portion intersecting the top surface 2 and the bottom surface 3 substantially perpendicularly. The side surface 4b is a side surface portion which intersects the top surface 2 at an angle less than 90° (at an acute angle), while intersecting the bottom surface 3 at an obtuse angle. That is, the side surface 4a is in a so-called negative relationship with respect to the top surface 2 and the bottom surface 3. In contrast, the side surface 4b is in a so-called positive relationship with respect to the top surface 2.

In the cutting insert 1 of the present embodiment, the side surface 4a and the side surface 4b are directly connected at the respective top portions 6 and 7 of the top surface 2 and the bottom surface 3 as described above, but the present invention is not limited to this constitution. That is, the shape may be such that at least one of top portions 6 and 7 of at least one of the top surface 2 and the bottom surface 3 is notched by a straight line, a curved line or the like. In this case, the side surface 4a and the side surface 4b are not directly connected to each other.

In the present embodiment, an arcuate intersecting ridge between the top surface 2 and the side surface 4a functions as a major cutting edge 8 which is a first cutting edge. This major cutting edge 8 functions as an outer peripheral cutting edge in a ball end mill. The outer peripheral cutting edge is a cutting edge arranged so as not to perform cutting up onto a tool rotating axis when the cutting insert is mounted to a tool body of the ball end mill, described later. Moreover, an arcuate intersecting ridge between the bottom surface 3 and the side surface 4a functions as a major cutting edge 9 which is a third cutting edge. This major cutting edge 9 also functions as an outer peripheral cutting edge in the ball end mill. That is, the intersecting ridges formed by the side surface 4a as well as the top surface 2 and the bottom surface 3 both function as the outer peripheral cutting edges. On the other hand, an arcuate intersecting ridge between the side surface 4b and the top surface 2 functions as a major cutting edge 10 which is a second cutting edge. This functions as a central cutting edge in the ball end mill. The central cutting edge is a cutting edge arranged so as to perform cutting up to a region on the tool rotating axis when the cutting insert is mounted to the ball end mill. Therefore, the cutting insert 1 of the present embodiment has two major cutting edges 8 and 9 as the outer peripheral cutting edges and one major cutting edge 10 as the central cutting edge.

The top surface 2 functions as a rake surface when the two major cutting edges 8 and 10 act as the cutting edges. In this case, the bottom surface 3 functions as an insert fixing surface in contact with the tool body. When the major cutting edge 8 formed by the top surface 2 and the side surface 4a acts as the cutting edge, the side surface 4a functions as a flank with a clearance angle at 0°, while the side surface 4b functions as the insert fixing surface in contact with the tool body. Moreover, when the major cutting edge 10 formed by the top surface 2 and the side surface 4b acts as the cutting edge, the side surface 4b having a positive clearance angle functions as a flank, while the side surface 4a functions as the insert fixing surface in contact with the tool body. On the other hand, when the major cutting edge 9 provided on the bottom surface 3 side acts as the cutting edge, the bottom surface 3 functions also as its rake surface. In this case, the top surface 2 functions as the insert fixing surface in contact with the tool body. The side surface 4a functions as the flank with a clearance angle at 0°, while the side surface 4b functions as the insert fixing surface in contact with the tool body. The "clearance angle" herein is assumed to refer to an angle when the cutting insert is considered as a single body, that is, when a relation with a workpiece is not considered.

Figure 2A:
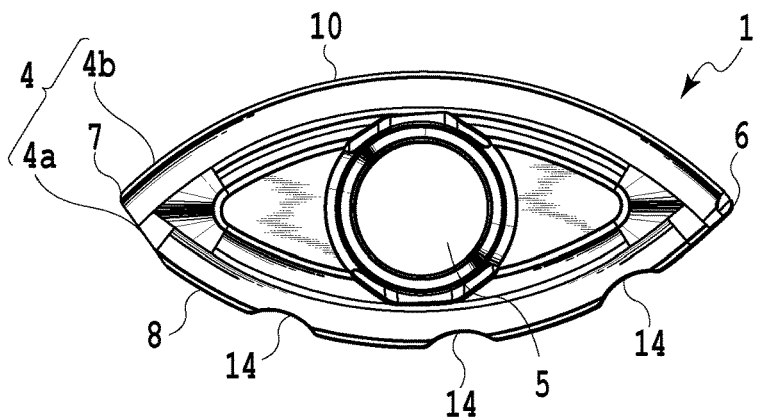
FIG. 2A illustrates a top view of the cutting insert in FIG. 1, as viewed in a direction indicated by IIA.
Figure 2B:
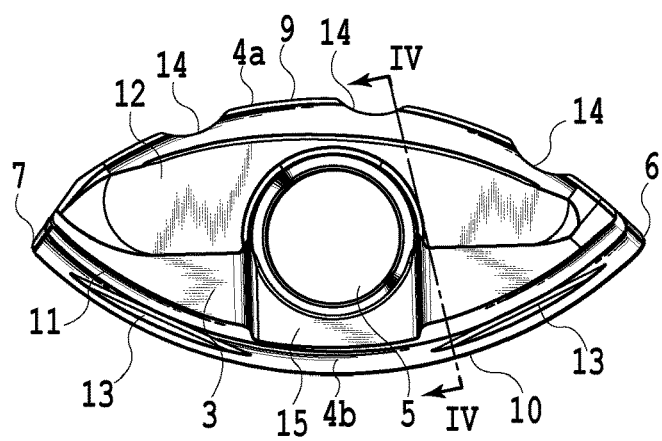
FIG. 2B illustrates a bottom view of the cutting insert in FIG. 1, as viewed in a direction indicated by IIB.
Figure 3:
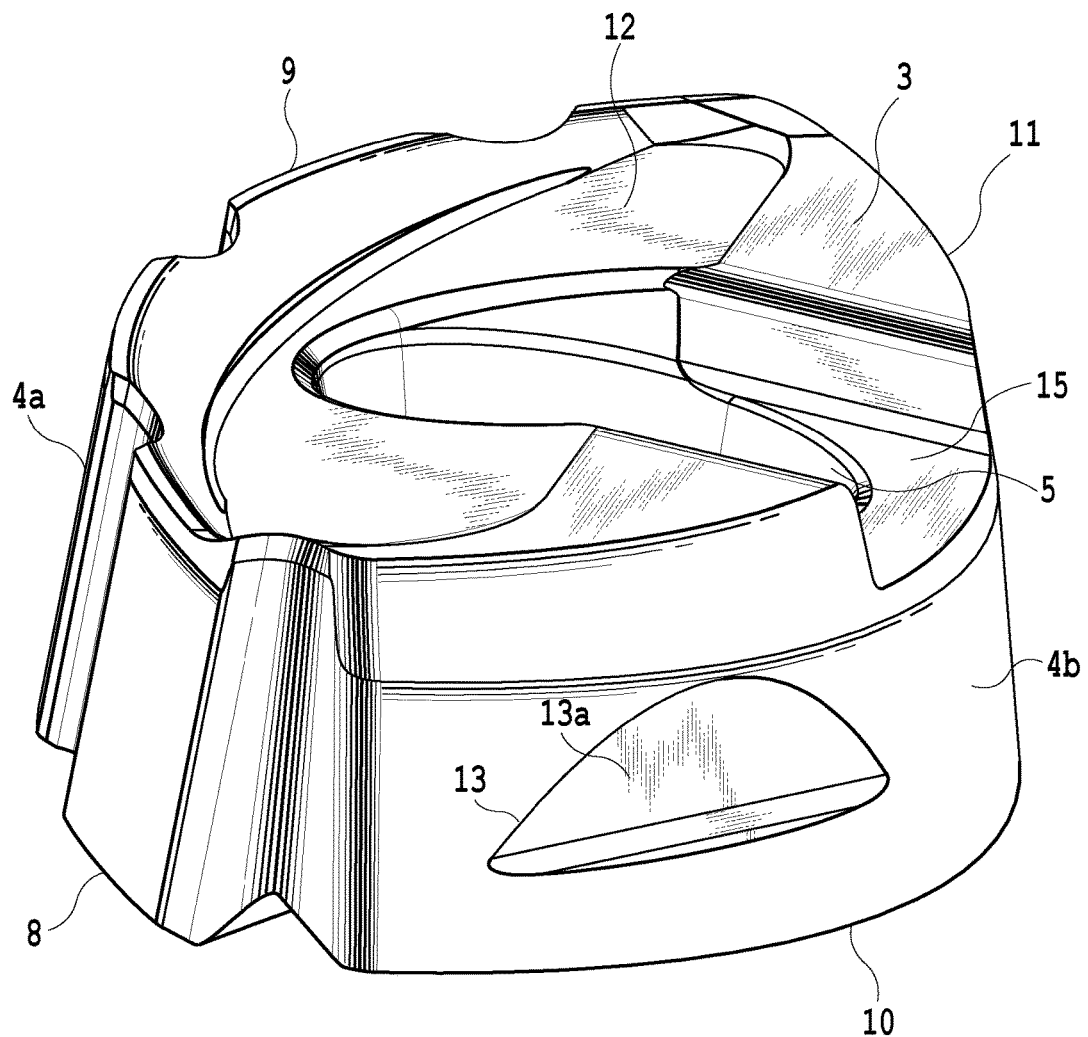
FIG. 3 illustrates a perspective view of the cutting insert in FIG. 1, as viewed from a bottom surface side.
Figure 4:
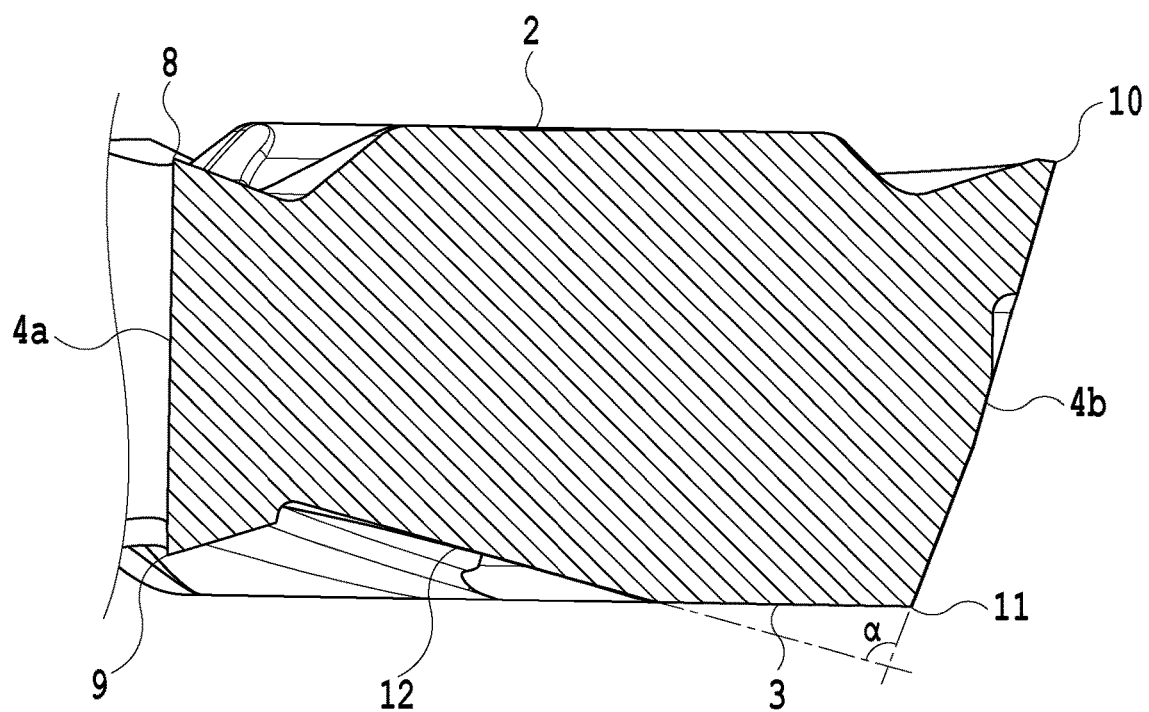
FIG. 4 is a sectional view of the cutting insert along an IV-IV line in FIG. 2B.

On the bottom surface 3, as illustrated in FIG. 3 particularly clearly, an inclined surface 12 inclined so as to gradually approach the top surface 2 as it goes from the side surface 4b side toward the side surface 4a side is formed. The inclined surface 12 may be formed over the entire bottom surface 3 but in the present embodiment, as illustrated in FIGS. 3 and 2A, it is provided from a portion spaced away from the side surface 4b by some distance (a portion along a line connecting the top portions 6 and 7, for example) to a portion in front of the cutting edge 9 of the side surface 4a (hereinafter referred to as an inclined surface end portion). A region in which the inclined surface 12 is formed is not limited to the above but it is only necessary that the inclined surface is formed at least in a part of the bottom surface 3. However, it is preferably provided so that the inclined surface end portion is located closer to the side surface 4a than the side surface 4b. Moreover, it is more preferably provided so as to follow the entire intersecting ridge (cutting edge 9) between the side surface 4a and the bottom surface 3. As illustrated in FIG. 4 illustrating a section along an IV-IV line in FIG. 2B, that is, a section perpendicular to an intersecting ridge 11 between the bottom surface 3 and the side surface 4b in a plan view, assuming that an intersection angle between an extension line of the inclined surface 12 and an extension line of the side surface 4b is α, the intersection angle α in the present embodiment is 95°. However, the intersection angle α is not limited to that and it is preferably 115° or less. Moreover, the intersection angle cc is more preferably 98° or less. The reason why these intersection angles are preferable will be described later.

Moreover, a recessed portion 13 may be provided in the side surface 4b. In the present embodiment, on the side surface 4b, two recessed portions 13 each having a half moon shape are apposed in a manner that chord portions are directed to the top surface 2 side. As is illustrated the best in FIG. 3, this recessed portion 13 is formed so that a surface 13a on a recessed depth side is substantially perpendicular to the top surface 2 or the bottom surface 3. That is, the recessed portion 13 is provided so as to be a so-called negative side surface. Thus, the recessed portion 13 is inclined to the side surface 4b so that a depth from the side surface 4b gradually increases from the bottom surface 3 side toward the top surface 2 side. A shape or a number of this recessed portion 13 is not limited to the illustrated embodiment but may be changed as appropriate by considering a situation in which the ball end mill to which the cutting insert is applied is used and the like.

Moreover, on the side surface 4a, nicks 14 may be formed. In the present embodiment, each of the nicks 14 is formed linearly at the side surface 4a between the top surface 2 and the bottom surface 3 so as to intersect the major cutting edges 8 and 9 substantially perpendicularly. Chips are finely fractured by the nicks 14, and effects such as reduction of cutting resistance and improvement of chip control performance are obtained. A shape, a number or an arrangement interval of the nicks 14 is not limited to the above but may be changed as appropriate in view of cutting performances and the like in demand.

Figure 2C:
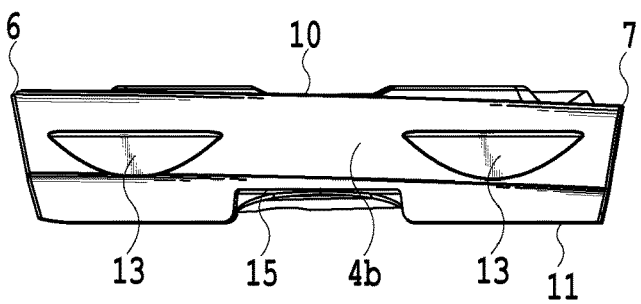
FIG. 2C illustrates a side view of the cutting insert in FIG. 1, as viewed in a direction indicated by IIC.
Figure 2D:
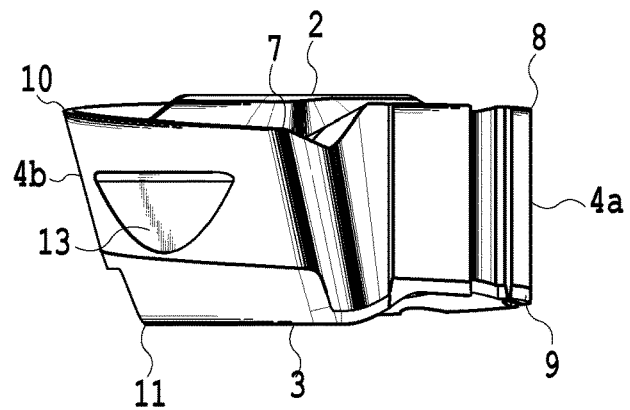
FIG. 2D illustrates a side view of the cutting insert in FIG. 1, as viewed in a direction indicated by IID.

Moreover, as illustrated in FIGS. 2C and 3, a recess 15 may be formed along a part of the side surface 4b on the bottom surface 3. In the present embodiment, this recess 15 is provided on the bottom surface 3 such that it has a width wider than a diameter of the mounting hole 5 from the mounting hole 5 to the side surface 4b. Therefore, as the cutting insert 1 of the present embodiment is viewed sideways as illustrated in FIG. 2C, the intersecting ridge 11 between the bottom surface 3 and the side surface 4b is partly cut out near substantially the center thereof. The recess 15 provided on the bottom surface 3 functions as an anti-rotation mechanism and a misplacement prevention mechanism of the cutting insert 1 when the cutting insert 1 of the present embodiment is mounted on the tool body. A width, a cutout depth and the like of this recess 15 may be changed as appropriate as long as it exerts functions as the anti-rotation mechanism and the misplacement prevention mechanism.

Subsequently, the indexable ball end mill 20 of three-blade type to which the aforementioned cutting inserts 1 are mounted will be described in detail by referring to the attached drawings.

Figure 5A:
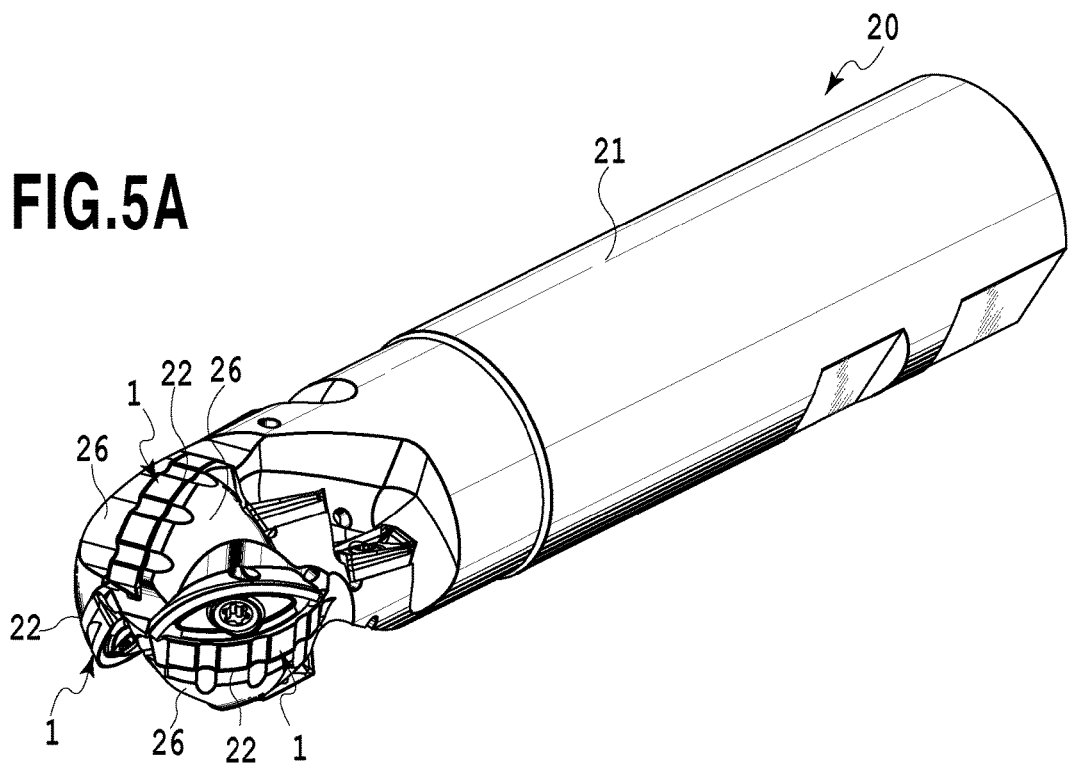
FIG. 5A illustrates a perspective view of an indexable ball end mill to which the cutting insert in FIG. 1 is mounted.
Figure 5B:
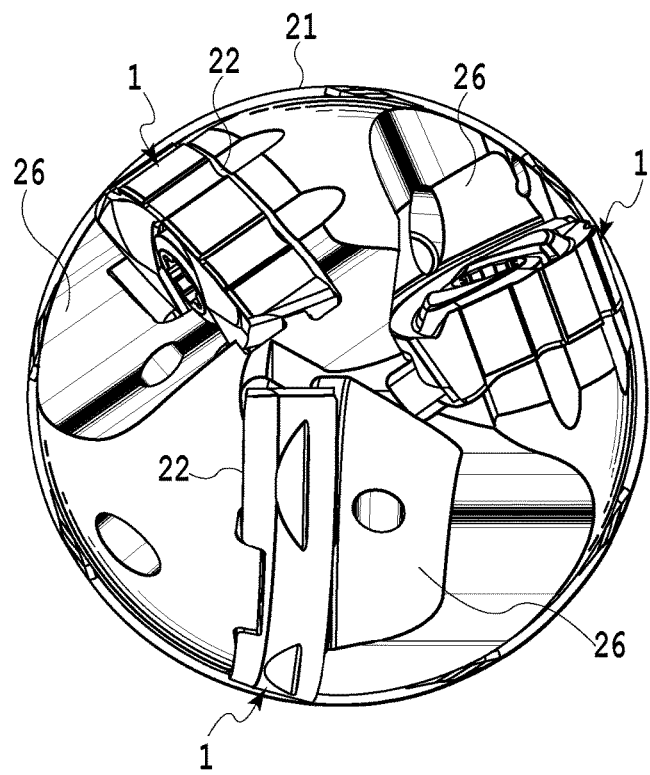
FIG. 5B illustrates an end surface view of a indexable ball end mill to which the cutting insert in FIG. 1 is mounted.

As illustrated in FIGS. 5A and 5B, the indexable ball end mill 20 of the present embodiment is of a three-blade type. Three insert seats 22 are provided at a tip portion of a substantially cylindrical tool body 21. Adjacent to the three insert seats 22, three chip pockets 26 are provided. The three insert seats 22 may be provided at substantially the equally or unequally angular intervals as the substantially cylindrical tool body 21 is viewed from a distal end as shown in FIG. 5B.

Figure 6:
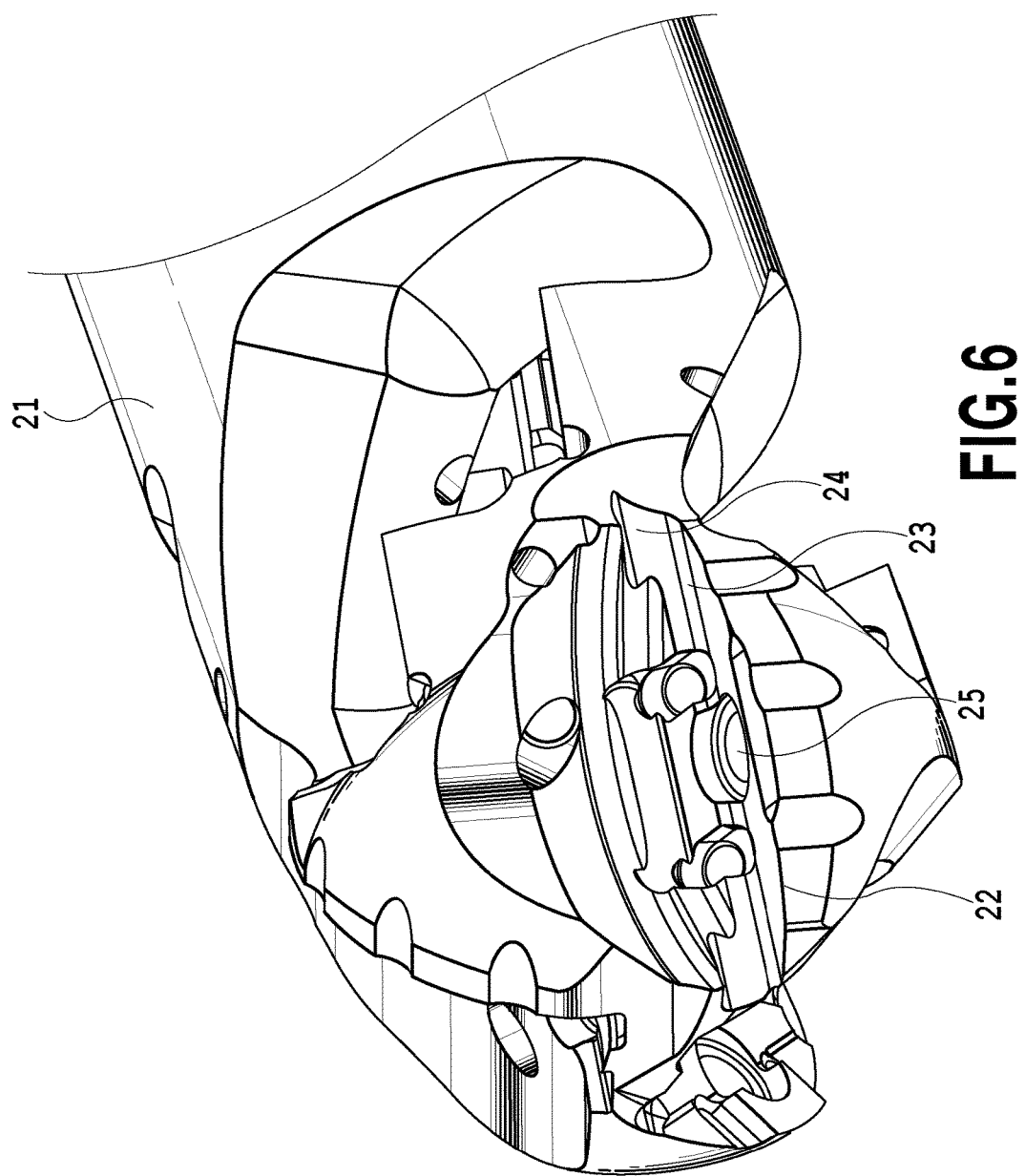
FIG. 6 illustrates an enlarged view of a tip end portion of a tool body illustrated in FIG. 5A.

Each of these insert seats 22 is, as shown in FIG. 6, constituted by a bottom surface 23 and a side surface 24 intersecting the bottom surface 23 that have a shape in conformity with a contour shape of the aforementioned cutting insert 1. In the vicinity of the substantial center of the bottom surface 23 of the insert seat, a screw hole 25 for mounting the cutting insert 1 is provided. The cutting insert 1 is mounted so that the top surface 2 or the bottom surface 3 abuts against the bottom surface 23 of the insert seat, and the side surface 4a or the side surface 4b abuts against the side surface 24 of the insert seat. At that time, the three cutting inserts 1 can be mounted so that any of the three major cutting edges 8, 9, and 10 is involved in cutting.

Shapes of the bottom surface 23 and the side surface 24 are different depending on the respective insert seats. When the cutting insert 1 is mounted such that the major cutting edge 8 on the top surface 2 side functions as the outer peripheral cutting edge is involved in cutting, the top surface 2 becomes a rake face, and the side surface 4a becomes a flank and thus, the bottom surface 3 and the side surface 4b function as abutment surfaces in contact with the bottom surface 23 and the side surface 24 of the insert seat 22, respectively. Therefore, the bottom surface 23 and the side surface 24 of the insert seat 22 with which the cutting insert 1 is in contact in the position have shapes adapted to the contact, and the side surface 24 is formed to have inclination so as to intersect the bottom surface 23 at an obtuse angle. When the cutting insert 1 is mounted such that the major cutting edge 9 on the bottom surface 3 side functioning as the outer peripheral cutting edge is involved in cutting, the bottom surface 3 becomes a rake face, and the side surface 4a becomes a flank and thus, the top surface 2 and the side surface 4b function as the abutment surfaces in contact with the bottom surface 23 and the side surface 24 of the insert seat 22, respectively. Therefore, the bottom surface 23 and the side surface 24 of the insert seat 22 with which the cutting insert 1 is in contact in the position have shapes adapted to the contact, and the side surface 24 is formed to have inclination so as to intersect the bottom surface 23 at an acute angle. When the cutting insert 1 is mounted such that the major cutting edge 10 on the top surface 2 side functioning as the central cutting edge is involved in cutting, the top surface 2 becomes a rake face, and the side surface 4b becomes a flank and thus, the bottom surface 3 and the side surface 4a function as abutment surfaces in contact with the bottom surface 23 and the side surface 24 of the insert seat 22, respectively. Therefore, the bottom surface 23 and the side surface 24 of the insert seat 22 with which the cutting insert 1 is in contact in the position have shapes adapted to the contact, and the side surface 24 is formed to intersect the bottom surface 23 substantially perpendicularly.

Subsequently, actions/effects of the cutting insert 1 of the present embodiment and the indexable ball end mill 20 provided therewith will be described.

In the cutting insert 1 of the present embodiment, the inclined surface 12 inclined so as to gradually approach the top surface 2 with increasing distance from the side surface (side surface having a positive shape) 4b side intersecting the top surface 2 at an angle less than 90° is formed at least in a part of the bottom surface 3 as described above. As a result, lifting (rolling) of the cutting insert 1 during cutting is greatly suppressed. The reason for that will be described below.

An undesirable motion such that the cutting insert is pulled off the side surface of the insert seat by a moment caused by cutting resistance applied to the cutting edge and is lifted or shifted occurs particularly when the major cutting edge 8 functioning as the outer peripheral cutting edge on the top surface 2 side is mounted in the position so as to involve in cutting. This is because, when the cutting insert 1 is to be mounted in that position, the side surface 24 of the insert seat 22 to be abutted has inclination so as to intersect the bottom surface 23 at an obtuse angle, in conformity with the positive side surface 4b of the cutting insert 1. In general, when the cutting insert is mounted to the tool body, friction resistance is generated between the side surface of the insert seat and the side surface of the cutting insert in contact with each other. Magnitude of this friction resistance is determined by μ (friction coefficient)×F (force in a direction perpendicular to an abutment side surface of the cutting insert). Therefore, the larger a value of this F is, the more the friction resistance between the cutting insert and the insert seat increases and thus, the cutting insert becomes difficult to be shifted. However, in the cutting insert having the side surface forming an acute angle to the top surface 2 (therefore, forming an obtuse angle to the bottom surface 3), the value of F is small and the friction resistance is weak and thus, the cutting insert is shifted easily.

Figure 7:
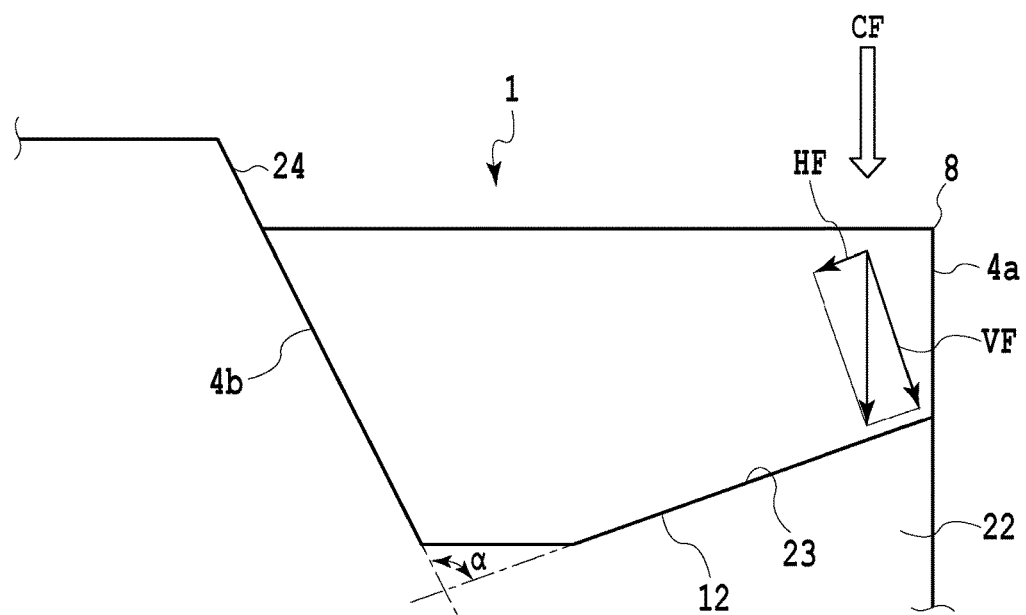
FIG. 7 illustrates a schematic sectional view of a state in which the cutting insert is mounted on an insert seat of the tool body in order to explain an action of the present invention.

On the other hand, in the cutting insert 1 and the tool body 21 of the present embodiment, as schematically illustrated in FIG. 7 which is an outline view, the aforementioned inclined surface 12 is provided on the bottom surface 3 of the cutting insert 1, while the bottom surface 23 having the shape in conformity with the shape of the inclined surface 12 is provided on the insert seat 22 of the tool body 21. Thus, cutting resistance CF applied to the cutting edge 8 is resolved into a force VF perpendicular to the inclined surface 12 and a force HF parallel thereto. That is, the force component HF which is a part of the cutting resistance CF can be directed to the side surface 4b side of the cutting insert 1. Therefore, since the aforementioned value of F can be increased, as a result, the friction resistance between the side surface 4b of the cutting insert 1 and the side surface 24 of the insert seat 22 abutting each other with forming an angle of 90 degrees or more to the bottom surface 3 and the bottom surface 23, respectively, is increased. That is, in the present embodiment, the cutting resistance CF is used for increasing the friction resistance between the cutting insert 1 and the insert seat 22. As a result, fixability of the cutting insert 1 is greatly improved, and the undesirable motion such as lifting or shifting of the cutting insert 1 during cutting is largely suppressed.

Moreover, by providing the inclined surface 12 so that the end portion of the inclined surface is located close to the side surface 4a, fixability of the cutting insert 1 is further improved. This is because, since a moment acts for rotating the cutting insert 1 with the cutting edge 8 to which the cutting resistance CF is applied as the point of effort and the inclined surface end portion of the inclined surface 12 as a fulcrum, by setting a horizontal distance between the cutting edge 8 as the point of effort and the inclined surface end portion of the inclined surface 12 as the fulcrum as small as possible, a force to be transmitted to the side surface 4a side is decreased, and lifting can be suppressed more efficiently in compliance with the "principle of leverage".

Moreover, the intersection angle α between the extended line of the inclined surface 12 and the extended line of the side surface 4b is preferably 115° or less. This is because, the inventor has confirmed through verification that, if the intersection angle α is larger than 115°, a force component F in a direction perpendicular to the side surface 4b of the horizontal force component HF becomes relatively smaller, and required friction resistance cannot be obtained in some cases. Moreover, this intersection angle α is more preferably 98° or less. It has been confirmed that, if the intersection angle α is 98° or less, the force component F in the direction perpendicular to the side surface 4b of the horizontal force component HF can be ensured in sufficient magnitude to stably fix the cutting insert 1. That is, it has been confirmed that, with this intersection angle α, the required friction resistance can be substantially obtained at 115° or less and sufficient friction resistance can be obtained at 98° or less.

Moreover, by providing the recessed portion 13 in the side surface 4b, fixing performances of the cutting insert 1 can be further improved. This is because sliding up of the insert seat 22 on the side surface by the cutting insert 1 is suppressed by engagement of the side surface 24 of the insert seat 22 with the recessed portion 13.

Then, the cutting insert 1 of the present embodiment has, as described above, the major cutting edge 8 functioning as the outer peripheral cutting edge and the major cutting edge 10 functioning as the central cutting edge on the top surface 2 and has the major cutting edge 9 functioning as the outer peripheral cutting edge on the bottom surface 3. As a result, in the three-blade type indexable ball end mill, all the three cutting edge functions of the ball end mill may be borne by with one type of the cutting insert 1 by appropriately reversing a mounting direction of the top/bottom surface and the mounting direction of a proximal/distal, and multiple use of the one type of the cutting insert is allowed. At this time, the top surface 2 and the side surface 4b are preferably in a positive relationship. This is because, since the major cutting edge 10 functioning as the central cutting edge with a large cutting edge length is of positive type, cutting ability of the ball end mill can be further improved. Moreover, in addition to the fact that the major cutting edge 10 functioning as the central cutting edge is of positive type, it is preferable that the side surface 4a substantially perpendicularly intersects the top surface 2 and the bottom surface 3 such that the two major cutting edges 8 and 9 functioning as the outer peripheral cutting edges are of negative type. As a result, since either one of the two major cutting edges 8 and 9 functioning as the outer peripheral cutting edges does not become completely negative type, that is, the clearance angle does not become less than 0°, the three cutting edges 8, 9, and 10 can exert an optimal cutting ability as a whole. Moreover, since the outer peripheral cutting edge is also a cutting edge in charge of rough machining, it is preferably negative with high cutting edge strength.

Moreover, the inclined surface 12 is preferably provided so that the inclined surface end portion follows the entire intersecting ridge (cutting edge 9) between the bottom surface 3 and the side surface 4a. This is because, in the ball end mill, it is likely that any portion of the arcuate major cutting edge 8 on the top surface 2 is subjected to cutting resistance depending on a cutting situation, and thus, by arranging the inclined surface on the entirety thereof, a fixing force can be improved in response to any cutting situation.

The present invention is not limited to the cutting insert for the indexable ball end mill having the shape of the overlapping portion of two circles in a plan view but can be applied to a cutting insert having a polygonal shape such as a triangle or a square. Therefore, the indexable cutting tool of the present invention is not limited to the ball end mill but may be in a form of a indexable cutting tool such as a face mill or other types of end mills.

That is, in the aforementioned embodiment, exemplified is the constitution including the cutting insert having the three major cutting edges formed and the tool body having the three insert seats corresponding to the position of the cutting insert and capable of bearing the functions of all the three cutting edges of the ball end mill only by one type of the cutting insert. However, the present invention is not limited to the constitution of the ball end mill as such. That is, the present invention can be widely applied to indexable cutting tool to which a cutting insert having at least one cutting edge is mounted such that the cutting edge is involved in cutting and being constituted such that a surface (first surface) including a rake face of the cutting edge and a side surface portion on a side opposite to the cutting edge intersect at an angle less than 90°, in which prevention of an undesirable motion of the cutting insert caused by cutting resistance applied to the cutting edge is made effective. Therefore, a number of the cutting edges or structures of the cutting insert and the insert seat of the tool body may be determined as appropriate, and the present invention also exists in the tool body having such insert seat and hence, a indexable cutting tool provided with the tool body and the cutting insert.

However, in the case of the ball end mill, since the length of the cutting edge is long, the cutting resistance applied to the cutting edge is relatively large, and the undesirable motion of the cutting insert likely to occur. Therefore, the present invention is particularly effective if it is applied to the ball end mill.

The present invention is not limited to the aforementioned typical embodiment and variation but is capable of various changes and can be replaced or changed as long as it does not depart from a spirit and a scope of the present invention defined in claims of the present application.

The invention claimed is:

1. A tool body of an indexable ball end mill, having a substantially cylindrical shape, comprising:
   three insert seats which are provided on a tip portion and to each of which a cutting insert is mounted, the cutting insert having a first surface, a second surface opposite to the first surface, and a side surface connecting the first surface and the second surface to each other, the side surface includes a first side surface and a second side surface opposite to the first side surface,
   a part of an intersecting ridge between the first surface and the first side surface functions as a first cutting edge,
   wherein on the second side surface, a side surface portion in contact with a, ridge portion opposite to the first cutting edge intersects the first surface at an angle less than 90°,
   the ridge portion opposite to the first cutting edge, between the first surface and the side surface portion, functions as a second cutting edge,
   an inclined surface which gradually approaches the first surface with increasing distance from the side surface portion is formed on at least a part of the second surface,
   each of the first surface and the second surface has a shape of an overlapping portion when two circles partly overlap each other in a plan view,
   the first side surface intersects the first surface substantially perpendicularly,
   a third cutting edge is formed on an intersecting ridge between the second surface and the first side surface, and wherein
   the three insert seats include two insert seats for outer peripheral cutting edges and one insert seat for a central cutting edge, and
   the three cutting inserts are mounted such that the first cutting edge is involved in cutting on one of the insert seats for the outer peripheral cutting edges, the third cutting edge is involved in cutting on the other of the insert seats for the outer peripheral cutting edges, and the second cutting edge is involved in cutting on the insert seat for the central cutting edge.

2. An indexable cutting tool comprising a tool body and a cutting insert, the tool body comprising an insert seat to which the cutting insert is mounted, the cutting insert having a first surface, a second surface opposite to the first surface, and a side surface connecting the first surface and the second surface to each other, the side surface includes a first side surface and a second side surface opposite to the first side surface,
   the first side surface intersects the first surface and the second surface substantially perpendicularly
   a part of an intersecting ridge between the first surface and the first side surface functions as a first cutting edge,
   wherein on the second side surface, a side surface portion in contact with a ridge portion opposite to the first cutting edge intersects the first surface at an angle less than 90°,
   the ridge portion opposite to the first cutting edge, between the first surface and the side surface portion, functions as a second cutting edge,
   an inclined surface which gradually approaches the first surface with increasing distance from the side surface portion is formed on at least a part of the second surface,
   the inclined surface abuts against a bottom surface of the insert seat,
   a third cutting edge is formed on an additional intersecting ridge between the second surface and the first side surface.

* * * * *